MESH ANALYSIS

A          B

A          B

# United States Patent Office 3,704,131
Patented Nov. 28, 1972

3,704,131
READILY DISPERSIBLE DRY GLUTEN PRODUCT, PROCESSES FOR MAKING IT, AND USES THEREOF
Richard J. Hampton, Pierrefonds, Quebec, Jacques R. Rolland, Longueil, Quebec, and Thomas Gallo, Toronto, Ontario, Canada, assignors to The Ogilvie Flour Mills Company, Limited, Montreal, Quebec, Canada
Filed Apr. 7, 1970, Ser. No. 26,405
Int. Cl. A23j 3/00; A21d 2/36
U.S. Cl. 99—17   2 Claims

ABSTRACT OF THE DISCLOSURE

Powdered vital wheat gluten is difficult to disperse in water and a dispersion, once obtained, is unstable since individual particles readily coalesce with the formation of an intractable, lumpy mass. By converting the powdered gluten into novel structures in the form of agglomerates thereof under conditions which do not denature the gluten, the gluten can be readily wetted out and dispersed in water to form a relatively stable dispersion. Accordingly, the agglomerated gluten is ideally suited for the manufacture of yeast-leavened bakery products, especially by continuous dough-making processes.

BACKGROUND OF INVENTION (a) Field of invention

This invention relates broadly to a novel gluten product, processes for obtaining it and uses thereof. More particularly, this invention is concerned with a vital wheat gluten product of novel physical structure endowing it with improved functionality, to processes for producing it and to its utilisation in making different products, especially, though not exclusively, yeast-leavened bakery products.

(b) Description of the prior art

Vital wheat gluten (sometimes referred to herein, for convenience, simply as gluten), is a concentrated natural protein in the form of a light tan powder having a bland taste and aroma. It usually contains 75% to 80% protein, 6% to 8% fat-like phospholipids and related compounds, some fiber, residual starch, a small amount of mineral matter and between 4% and 6% residual moisture. It is normally insoluble in neutral aqeuous solution (pH 4 to 8). For commercial purposes, vital wheat gluten is presently manufactured by one of several washing processes in which wheat flour is kneaded with water to remove the starch and water-soluble materials from the gluten. This gluten forms a tough, rubbery elastic mass containing a high proportion of water. This water must be removed rapidly without exposing the gluten to excessively high temperatures, since gluten, being a protein, can be denatured by exposure to high temperatures when in the wet state. Two drying processes are in common use, one involving spray drying and the other flash drying. The gluten from the former method tends to be finer than the flash dried gluten which, typically, has an average particle size of between 5 and 75 microns.

Vital wheat gluten is an increasingly important product of commerce, especially widely used today in the manufacture of yeast-leavened bakery products such as bread, rolls and buns. In this application, it supplements the natural flour protein where added strength is needed or desired for one or more of several reasons, say, to build stronger sidewalls in expanded white bread, or in the production of variety breads where the non-fluor proteins dilute the flour protein to such an extent that the latter protein cannot function satisfactorily without supplementation. It is also used in other food applications. For instance, it is used to increase the protein content, and hence the strength, of pasta-like products such as macaroni, and in the manufacture of dietary wafers. It is also used as a binder or diluent in pharmaceutical tablet formulations.

The utilisation of vital wheat gluten in applications such as the manufacture of yeast-leavened bakery products, is being hindered on account of the fact that it is not free-flowing or readily dispersible when added to water, and the dispersion, once obtained, is not very stable, having a tendency to lump and agglomerate. It is believed that this characteristic poor dispersibility can be attributed to two distinct, but inter-related, phenomena. Firstly, powdered gluten is highly hydrophilic so that upon initial wetting it hydrates rapidly to form discrete lumps consisting of a dough-like outer wall, which resists further moisture penetration, encapsulating a core of essentially dry unaltered powdered gluten at the center. These lumps can be smoothed out and broken up, though vigorous agitation is needed for this purpose. However, the disintegration of the lumps and dispersal of the particles is accompanied by the wetting of individual gluten particles. These individual, wetted particles, because of significant inter-molecular forces, exhibit cohesion so that they tend to coalesce, when they can be separated only by the exertion of considerable disruptive forces. Accordingly, a dispersion of ordinary powdered gluten once obtained is markedly unstable because of this tendency for coalescence between individual particles. Whatever the theoretical explanation, it is a fact, that on mixing vital wheat gluten with water, a lumpy product is obtained which, on vigorous agitation, is transformed into a high intractable, rubbery, elastic mass.

Efforts have been made in the prior art to overcome, or to improve upon, the poor dispersibility of powdered vital wheat gluten. In essence, prior practice has involved intimately incorporating, or coating the powdered gluten, with a small amount of certain selected materials, notably lipids. Lipids that have been used for this purpose include non-ionic hydrophilic lipids like monoglycerides, edible salts of lactylic esters of fatty acids, polyoxyethylene stearate, stearyl monoglyceride citrate, which provide a protective barrier or surface layer serving to reduce coalescence between particles of the thus-treated gluten. At the present time, a gluten coated with such a hydrophilic lipid, believed to be the monoglyceride, glyceryl monostearate, is commercially available. This material is effective to the extent that the hydrophilic lipids alleviate to a marked degree the cohesion problem so that the treated gluten tends to form a relatively stable dispersion once dispersed. However, it is found that the thus-treated gluten is of poor wettability so that on being added to water it does not disperse readily but instead tends to form a lumpy mass, requiring vigorous agitation in order to disperse the individual gluten particles.

Also, the treated gluten, because of the presence of an additional, relatively expensive, material often in substantial amounts (typically around 20%), which needs to be applied in a carefully controlled process, is significantly more expensive on a gluten basis than the untreated powdered gluten. This is a considerable deterrent to its widespread adoption by, for instance, the commercial baker who operates in a markedly cost conscious and highly competitive industry. This is further aggravated by the fact that the presence of a substantial amount of an extraneous material reduces the effective amount of gluten, the component of primary interest to the baker, in a given weight of the product; this markedly reduces the water absorption of the gluten product, and can complicate the baker's standard formulations and procedures. Furthermore, the materials used in the treatment may detract in one way or another from desired properties in the food or other product in which the treated gluten product is incorporated.

SUMMARY OF THE INVENTION

Broadly stated, we have now found, and this finding forms the basis for the present invention, that by converting ordinary powered vital wheat gluten into a novel physical form, the resulting gluten product is readily wettable and provides a relatively stable neutral aqueous dispersion with a reduced tendency toward particle cohesion.

A primary object of this invention, therefore, is to provide a dry gluten product of improved wettability which, in its own right, i.e. without the incorporation of, or coating by, a specific material, for instance, a lipid, can be readily dispersed in neutral aqueous dispersion (about pH 4 to 8) to give a stable dispersion exhibiting little or no tendency to coalesce into a rubber elastic mass.

Another object is to provide a relatively simple method of processing gluten powder to provide such a product.

A further object is to provide improvements in methods of making yeast-leavened bakery products using the dry gluten product of this invention.

Additional objects and features of this invention will appear from the following description in which reference will be made to the accompanying drawings in which.

In fulfilment of the foregoing and related ends, this invention provides a dry, undenatured gluten product in the form of coarse, porous, irregularly-shaped agglomerates composed of a multiplicity of individual vital wheat gluten particles adhered together in a random form and array. The major proportion of these agglomerates, often more than 90% of the total, have a particle size exceeding 150 microns and are characterised by a unique combination of physical properties such that the gluten product is free-flowing and readily wettable, and can be rapidly dispersed in neutral aqueous medium (about pH 4 to about pH 8) by no more than relatively gentle stirring to form a relatively uniform and stable dispersion therein.

In the derivation of the agglomerated gluten product, ordinary powdered gluten is subjected to a special treatment, in which the individual gluten particles are exposed to the action of a wetting agent under specific controlled conditions leading to the formation of the coarse, porous, irregularly-shaped agglomerates. Formation of the porous agglomerates results in a decrease in bulk density. The moist material is then dried, under controlled conditions, to remove excess free moisture to give an agglomerated gluten of a defined residual moisture content, which preferably is no more than about 10%. Advantageously, the drying of the product is controlled to give a total moisture content in the product of between 6 and 10%, preferably between 6 and 8%, for it has been found that this moisture content is associated with optimum dispersibility, the agglomerated gluten dispersing quite spontaenously on addition to water.

This product, as will be discussed in more detail hereinafter, possesses a number of characteristic properties which distinguish it from ordinary powdered gluten, and which in particular makes it possible to readily and quickly disperse the material in water to form a relatively stable dispersion, with no more than gentle agitation.

DETAILED DESCRIPTION OF INVENTION

Figure 1:
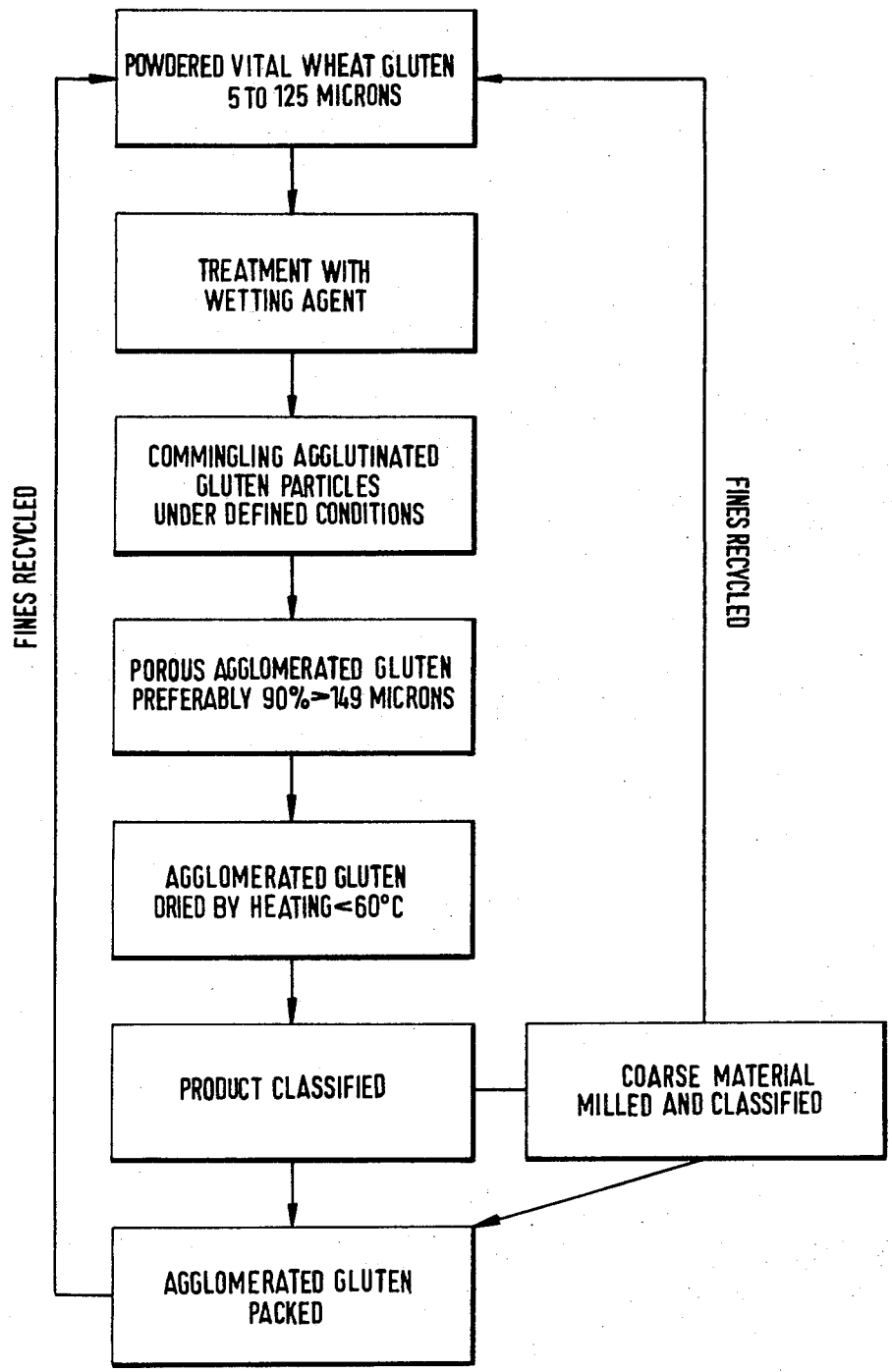
FIG. 1 is a flow sheet illustrating in a general way the process of making the gluten product of this invention.

Referring now to the flow sheet of FIG. 1 of the accompanying drawing, the gluten starting material can be of any particular or conventional type, whether spray or flash-dried, and is characterised by its fine powder form and its non-free-flowing properties reflected in a poor dispersibility, and a pronounced tendency for particle coalescence. The individual gluten particles range in size from about 5 microns to about 125 microns (average particle size=about 50 microns), depending, to some degree, on the method of preparation.

This gluten is then subjected to a special treatment wherein the individual particles are exposed to the action of a wetting agent so as to render the surfaces thereof sticky. The superficially agglutinated particles are then brought into intimate contact in such a way as to cause them to adhere together in the form of aggregates of random size and irregular shape, but always of a size substantially greater than the size of the individual particles constituting the initial gluten. The agglomerates are then dried to adjust the final residual moisture content to the preferred level of less than about 10%. Thereafter, the material is classified, and agglomerated gluten of the desired size and structure is delivered as a finished product and suitably packaged. Non-agglomerated and oversized material is recycled. The agglomerated gluten sttructures obtained are sufficiently strong and firm to withstand normal handling without giving rise to any serious disintegration problem.

In the wetting and drying steps, the conditions of time and temperature are selected and controlled to avoid any deleterious effect, as would, for instance, obtain were the gluten denatured, on the functional properties of the gluten in supplementing protein in food applications.

Usually, the wetting agent is either a liquid which, on contact with the gluten, renders the gluten particles tacky and causes them to adhere together in clusters following contact, by hydrating part or all of the gluten or otherwise transforming it to obtain this effect, or a solution or suspension of some ingredient in a liquid, such, for example, as sugar solution, so that this ingredient itself performs the agglomerating function.

Conveniently, the wetting agent is water or water vapor, though other substances such, for example, as ethanol, formic acid, acetic acid and ammonia may be used.

In a preferred embodiment of this invention, the gluten particles are superficially agglutinated with the wetting agent, agglomerated and dried almost instantaneously in a single treatment zone, thus eliminating any need to transfer the wet sticky agglomerates from an agglomerating zone to a drying zone. This may be achieved by:

(i) Forming the powdered gluten into a fluidized bed;

(ii) Maintaining the bed in a particulate fluidized state by passing a fluidizing gas, such as compressed air, upwardly through the bed;

(iii) Discharging a wetting agent in atomized form directly into the particulate, fluidized bed between the top and the bottom thereof. This wetting agent agglutinates the surfaces of the particles which are commingled, by the gentle agitation of particles in the bed, to an extent sufficient to cause such particles on contact with adjacent particles to adhere together in the form of moist, irregularly-shaped agglomerates; and (iv) Drying the agglomerates by means of the fluidizing gas, typically, by evaporation of the liquid therefrom.

The wetting, agglomerating, and drying follow in sequence but take place substantially instantaneously, and the agglomerates are then removed from the chamber.

Figure 2:
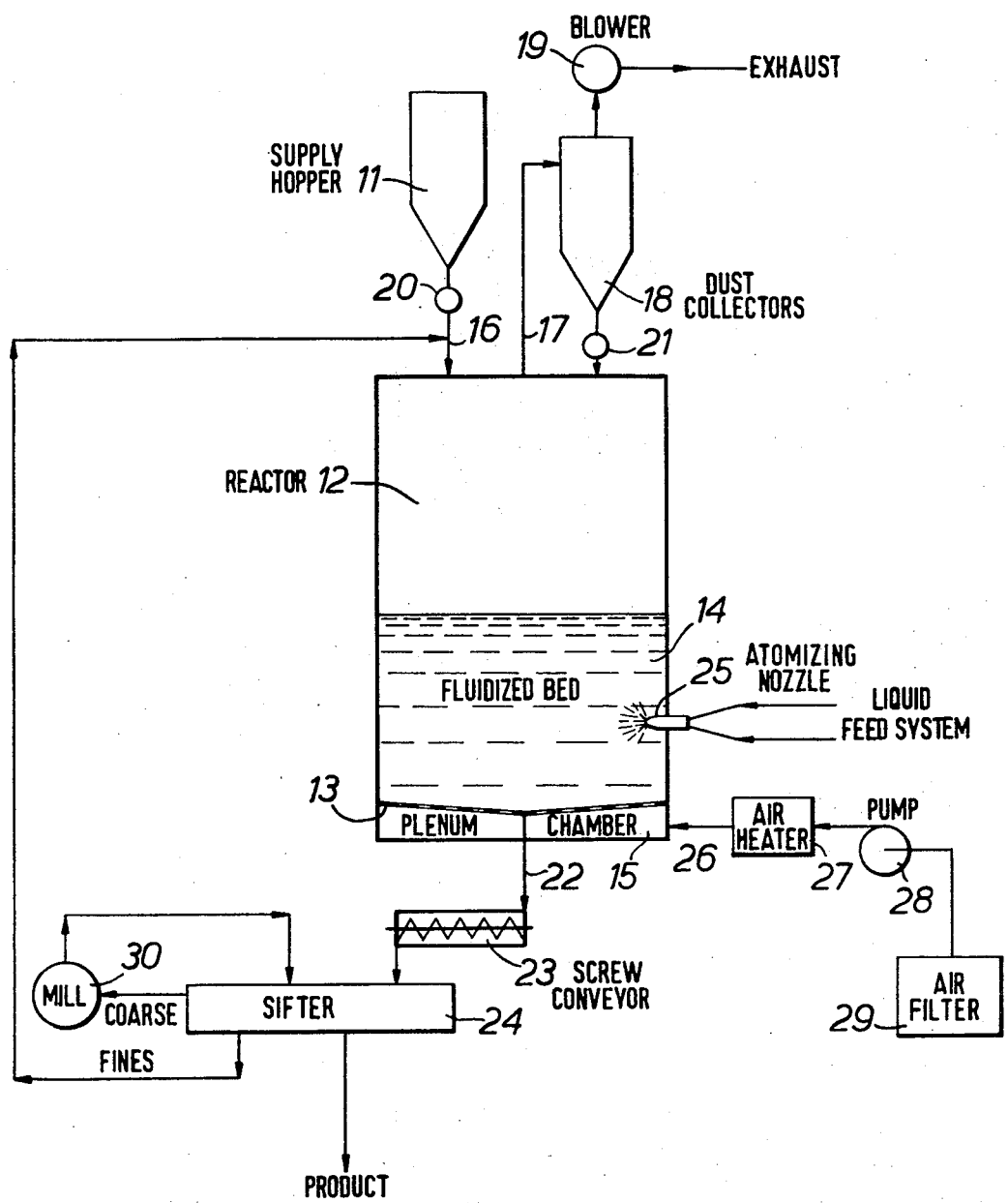
FIG. 2 is a schematic view of a preferred apparatus assembly for making the gluten product of this invention.

This preferred process will be further described with reference to FIG. 2 of the accompanying drawings which schematically illustrates a suitable apparatus assembly wherein it may be performed.

Referring to this figure, the apparatus assembly includes a supply hopper 11 for storing the powdered gluten and a reactor 12. This reactor is a vertical, cylindrical structure divided by a perforated diffuser plate 13 into an upper zone wherein the fluidized bed 14 is formed, and a lower zone in the form of a plenum chamber 15. A downwardly-extending duct 16 is provided in the roof of the reactor to receive the gluten from the supply hopper, while an upwardly-extending duct 17, also in the roof, is provided for the egress of the fluidizing gas, say, compressed air, from the reactor. This duct 17 connects with a dust collector 18 and a blower 19. Interposed in each of ducts 16 and 17 are rotary air locks 20 and 21. The floor of the reactor includes a discharge duct 22 for removal of the gluten, a major proportion of which normally will be in an agglomerated state. The discharge duct leads to a screw conveyor 23, fitted with a variable speed device to permit control of the discharge rate, and a sifter 24. Located in the wall of the reactor, in a median position, are a series of atomizing nozzles, one of which, 25, is shown, for introducing droplets of the wetting agent directly into the fluidized bed 14 located in the upper part of the reactor. The preferred system involves gas atomization. In the wall of the plenum chamber 15, below the atomizing nozzles, a duct 26 is located for introducing the fluidizing gas into the chamber. This duct is connected to a heater 27, a pump 28 and an air filter 29.

In obtaining the novel gluten product of this invention using the foregoing apparatus assembly, dry powdered gluten, usually with an average particle size of about 50 microns, is continuously fed from the supply hopper 11 into the upper part of the agglomerating reactor 12 at a rate which will maintain the desired dimensions of the fluidized bed 14 into which the gluten particles enter. The gluten in the bed is maintained in a fluidized state by passing heated air or a heated inert gas like nitrogen through filter 29, pump 28, heater 27, duct 26, plenum chamber 15 and diffuser plate 13 defining the bottom of the bed. The gas should be passed through the bed at a rate exceeding that required for incipient fluidization of the gluten. In most instances, the minimum velocity required to maintain the bed in a fluidized state is about 25 feet per minute (f.p.m.). Usually the flow rate is adjusted and controlled at between about 40 and about 80 f.p.m., preferably between about 50 and about 70 f.p.m. The temperature and flow rate of the fluidizing gas, which is heated on passage through the heater 27 should be controlled, in conjunction with the temperature and flow rate of the wetting agent to ensure that the gluten is not denatured as it would were the temperature to exceed about 60° C., and the agglomerated gluten product is of the desired moisture content. Conveniently, the temperature of the fluidizing gas is controlled at between 100° and 150° C., and the bed temperature at between 45° and 55° C.

After traversing the fluidized bed, the air or inert gas leaves the treatment chamber through the duct 17 leading to dust collector 18. The air or inert gas is exhausted from the dust collector by a blower 19 which is so designed and regulated as to maintain a slight vacuum e.g., between about 2–4 inches $H_2O$ in the upper part of the reactor. Gluten recovered from the gas by and in the dust collector is returned directly to the chamber through a suitable seal arrangement.

The wetting agent is introduced directly into the interior of the fluidized bed through the atomizing nozzles 25. Conveniently, the wetting agent is water, though a solution, slurry, emulsion or dispersion in water of any material that it may be desirable to add can be used. The wetting agent is fed to the atomizing nozzles at a uniformly controlled and predetermined rate based on the quantity of liquid that is required, at a given reactor temperature (not above 60° C.) and flow rate for the fluidizing gas, to effect satisfactory agglomeration and that, in addition, can be evaporated to yield gluten agglomerates of the desired size, structure and properties. Usually, the flow rate is between about 1 and about 4 gallons per hour for each nozzle, and the gas which usually is used to atomize the wetting agent is at a pressure of between about 25 to about 80 p.s.i.g., giving a droplet size of between 10 and 250 microns, preferably between 10 and 100 microns.

The water or other liquid in the wetting agent is immediately evaporated and carried off in the fluidizing gas passing out of the chamber.

A mixture of agglomerated and non-agglomerated material, i.e. gluten powder, is continuously withdrawn from the fluidized bed in the agglomerating chamber through the discharge duct 22 and variable speed screw conveyor 23 which permits control of the discharge rate. The optimum discharge rate depends on several factors such as desired size of the agglomerates, and the nature of the wetting agent, which must be determined in each instance by conducting a few trial runs in which the several variables are adjusted until the optimum is located. The residence time of the gluten particles in the fluidized bed should be so controlled that the gluten is not adversely affected. The mean residence time is usually of the order of 15 to 60 minutes.

The mixture is then conveyed by a conveyor belt to the sifter 24 equipped with two superposed decks of sieves of a mesh size suitable to select those agglomerates within the size range desired. Oversized agglomerates (course) may then be conveyed to a mill 30 where they are reduced in size and then recycled to the sifter 24. Undersized particles (fines) recovered from the sifter are reintroduced into the reactor 12.

Quite unexpectedly, it has been found, that the "protein" quality of the agglomerated gluten obtained by the methods of this invention, such as the foregoing, as compared with the quality of the powdered gluten starting material is unimpaired and substantially unchanged so that, in this important respect, it performs in a normal manner when used in the manufacture, for instance, of yeast-leavened bakery products. This is confirmed by the comparative tests detailed in examples hereinafter. At the same time, the functionality, and hence the utility of the agglomerated gluten in such applications is enhanced because of the improved dispersibility and resistance to particle coalescence following dispersion, i.e. dispersion stability.

The agglomerated gluten of this invention, as discussed in detail below, has a characteristic structure, and a combination of desirable physical properties, which serve to distinguish it from gluten presently available.

Structure

Individual gluten agglomerates are composed of a multiplicity, typically between about 3 and about 25, of gluten particles bonded together in a random array to give a coarse, irregularly shaped structure of marked porosity and with a surface area that is relatively large in relation to its bulk. The characteristic structure of the agglomerated gluten, and the contrast with powdered gluten are readily seen in the photomicrographs. A photomicrograph of a typical sample of the agglomerated gluten photographed at a magnification of 40x would clearly show the random aggregation of individual gluten particles into coherent irregularly-shaped structures. A photomicrograph of commercially available powdered gluten, at the same magnification would clearly show that in contrast to the agglomerated gluten, the particles of gluten powder are inherently separate and detached and individually of a relatively regular shape with a low surface area relative to the bulk thereof.

Properties (A) *Size.*—The size of the agglomerated gluten of this invention as recovered from the process varies, though usually a major proportion, preferably more than 90%, of the agglomerates remain on a 100 mesh screen (all mesh sizes quoted herein refer to U.S. Standard Sieve sizes) and are of a size in excess of 149 microns. In consrast, 90% of the particles in powdered gluten pass through the same screen size.

The size of the agglomerates is thought to be an important factor in securing the desired characteristics of the product. Thus, when the agglomerates are ground so that they pass through a 100 mesh screen, the product does not have the desired characteristics in respect of, for instance, the ability to quickly and readily disperse in water without vigorous agitation to form a relatively stable dispersion. Thus, it is considered important for the bulk of the agglomerated gluten to be of a size such that it will remain on a 100 mesh screen, or in other words is greater in size than 149 microns, which is usually obtained with the preferred method described above under varying operating conditions. Individual particles of such size are easily discernible to the naked eye, whereas particles of powdered gluten are not.

Figure 3:
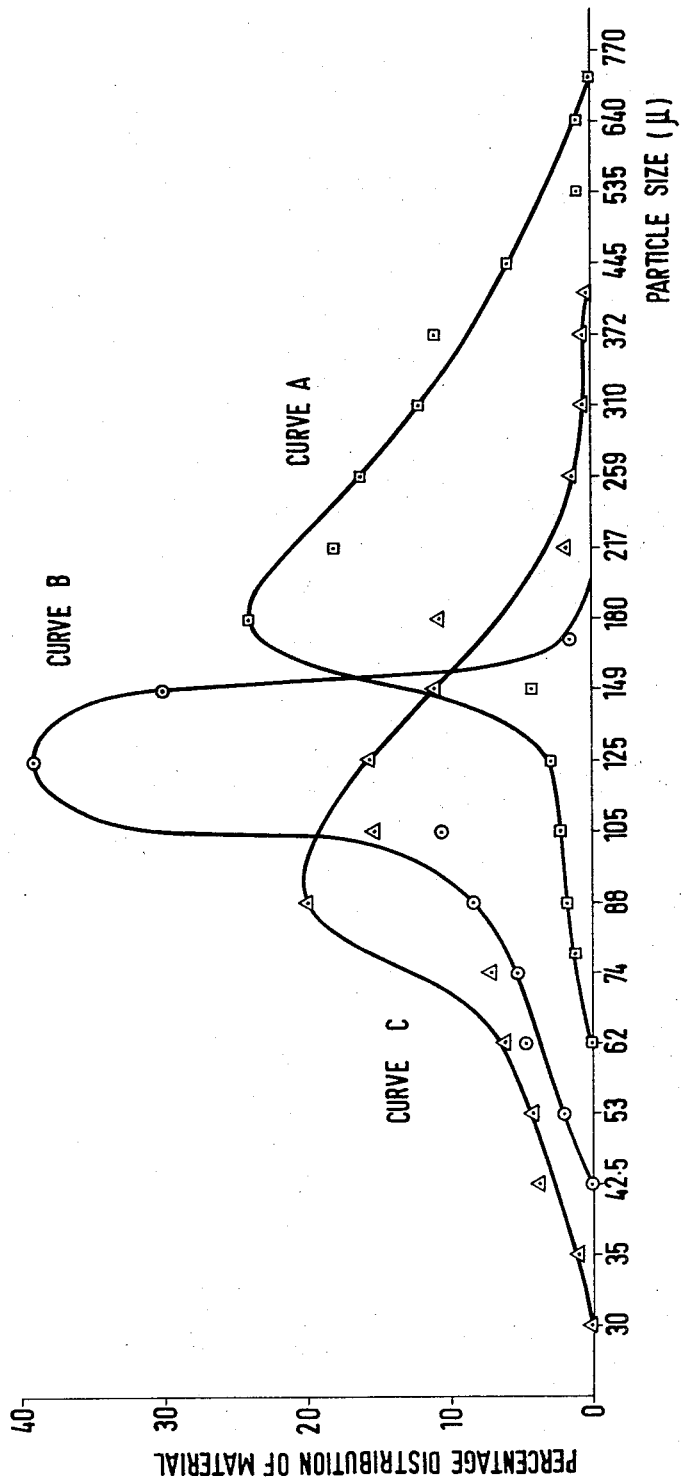
FIG. 3 is a graph illustrating the results of mesh analyses of the agglomerated gluten, ordinary powdered gluten and a treated powdered gluten product of the prior art.

FIG. 3 illustrates the results of mesh analyses upon a typical sample of agglomerated gluten made in accordance with the present invention and, for comparative purposes, a typical sample of powdered gluten, and a typical sample of a commercially available product comprising powdered gluten coated with 20% by weight monoglyceride (treated gluten). The desired series of sieves were stacked in their respective order in the series, with the finest mesh size at the bottom. A 100 gm. sample of the material to be tested was placed on the upper sieve, and the sieves placed in a Ro-Tap Sieve Shaker for 5 minutes. The material on each sieve was then weighed and the weight reported as a percentage of the total weight of material accounted for on the sieves and in the pan under the finest mesh size. Referring to the figure, curve A represents the mesh analyses of the agglomerated gluten, curve B represents the mesh analyses of the powdered gluten, while curve C represents the mesh analyses of the treated gluten. Essentially, these curves show the particle size disrtibution in the agglomerated gluten with the major proportion of a size in excess of 149 microns, in comparison with that of powdered gluten and treated gluten in which the bulk of the individual particles are of a size less than 149 microns.

(B) *Bulk density.*—The irregular shape and bulky nature of the agglomerated gluten is reflected in the bulk density thereof which is lower than the bulk density of powdered gluten, as determined by the following procedure:

The apparatus used was a Scott Volumeter (available from the Fisher Scientific Company). It comprised a large brass funnel with a metal screen, and a smaller funnel with a straight stem to direct the sifted gluten into a baffle box. This box had a series of glass baffle plates which regulated the fall of the gluten. A funnel at the bottom collected the gluten and directed it into a cubic inch receiver. This was a brass box with a capacity of exactly one cubic inch, and was supplied with a counterpoised weight. The gluten, sifted at the top, was baffled in its fall so that it actually entered the cubic inch receiver at the bottom under a constant head, which ensured the receiver being packed in the same manner each time. The receiver and contents were weighed and the weight of the gluten in the receiver obtained. The results (bulk density) were expressed in grams per cubic centimetre (gm./cc.).

A typical sample of agglomerated gluten with 92% of a particle size in excess of 149 microns, had a bulk density of .36 gm./cc. which contrasted with a bulk density of .42 gm./cc. for powdered gluten.

(C) *Flowability.*—The enhanced flowability of the agglomerated gluten compared with powdered gluten as well as a commercially available gluten product wherein the gluten is coated with 20% by weight of a monoglyceride (treated gluten) to improve functionality was demonstrated in the following way:

800 gms. of each product in turn were placed in a standard 60 degree powder funnel of the following dimensions:

|  | Mm. |
|---|---|
| Diameter | 150 |
| Overall height | 160 |
| Stem height | 15 |
| Stem diameter | 40 |

A stopper was fitted into the lower end of the funnel stem to prevent premature release of the material. The stopper was then removed, and the time required for the entire sample to discharge from the funnel reported as the flowability rate in seconds. The results are tabulated below:

Table I

| Product: | Flowability (secs.) |
|---|---|
| Agglomerated gluten average particle size >250μ | 12. |
| Powdered gluten | Would not flow. |
| Treated gluten | 26. |

It is apparent from the above data that the agglomerated gluten has a markedly superior flowability compared to both prior art gluten products.

(D) *Wettability-dispersibility.*—The enhanced wettability and dispersibility of the agglomerated gluten in contrast with powdered gluten as well as powdered gluten treated with 20% by weight of a monoglyceride can be demonstrated as follows:

A 400 ml. low form Griffin beaker was filled to approximately one inch from the top with water at 20° C. and a teaspoonful of each of the three materials in turn carefully placed on the surface of the water. The dispersal time was reported as the number of seconds required for all of the material to sink below the surface of the water:

(i) Agglomerated gluten

When the teaspoonful of a typical sample of agglomerated gluten was placed on the surface of the water, it floated thereon only transiently and progressive sinking occurred within a second or so. The dispersal time was 2 seconds. As the material sank toward the bottom of the beaker it disintegrated and dispersed without the need for even gentle stirring. In a short space of time (7 seconds), the bulk of the gluten was resting on the bottom of the beaker; gentle stirring recreated a uniform dispersion free from lumps.

(ii) Powdered gluten

When the test was applied to this material, the bulk of it floated upon the surface of the water, and when the contents of the beaker were permitted to stand without stirring, the powder formed a lumpy, doughball-like, mass. The dispersal time could not be ascertained since the bulk of the material never sank below the surface. On hand stirring the contents of the beaker, an intractable, elastic mass of hydrated gluten was formed instead of the powder dispersing to form a uniform slurry. In fact, even vigorous agitation was not effective in breaking up the lumps.

(iii) Treated powdered gluten

When the test was applied to this material, the bulk of it initially floated upon the surface and only slowly sank below. The dispersibility time was 3½ hours. This could be shortened by vigorously agitating the material when it sank and disintegrated to form a relatively stable dispersion.

Figure 4:
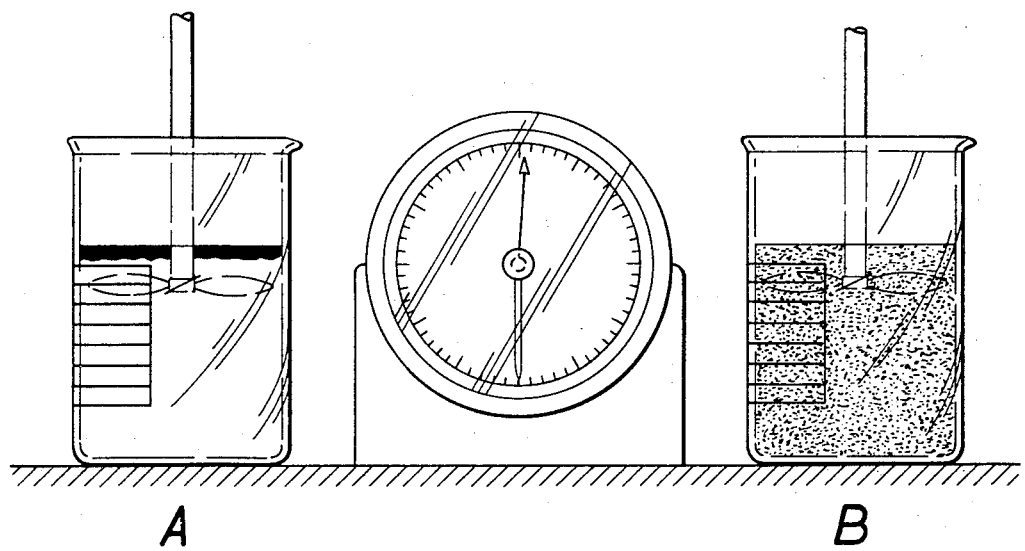
FIGS. 4 and 5 are photographs serving to illustrate the improved dispersibility of the agglomerated gluten in contrast with ordinary powdered gluten and a treated powdered gluten product of the prior art.
Figure 5:
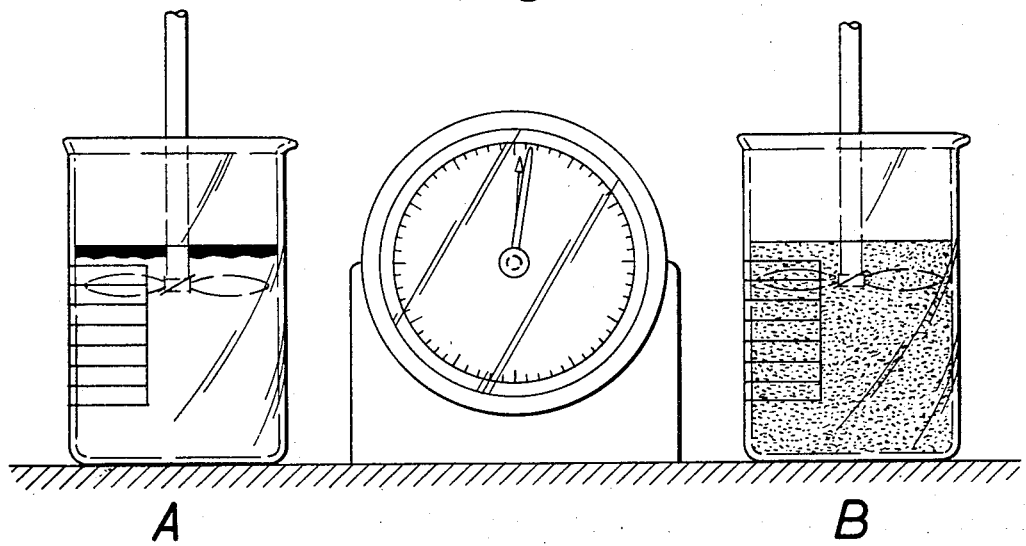
Figure 6:
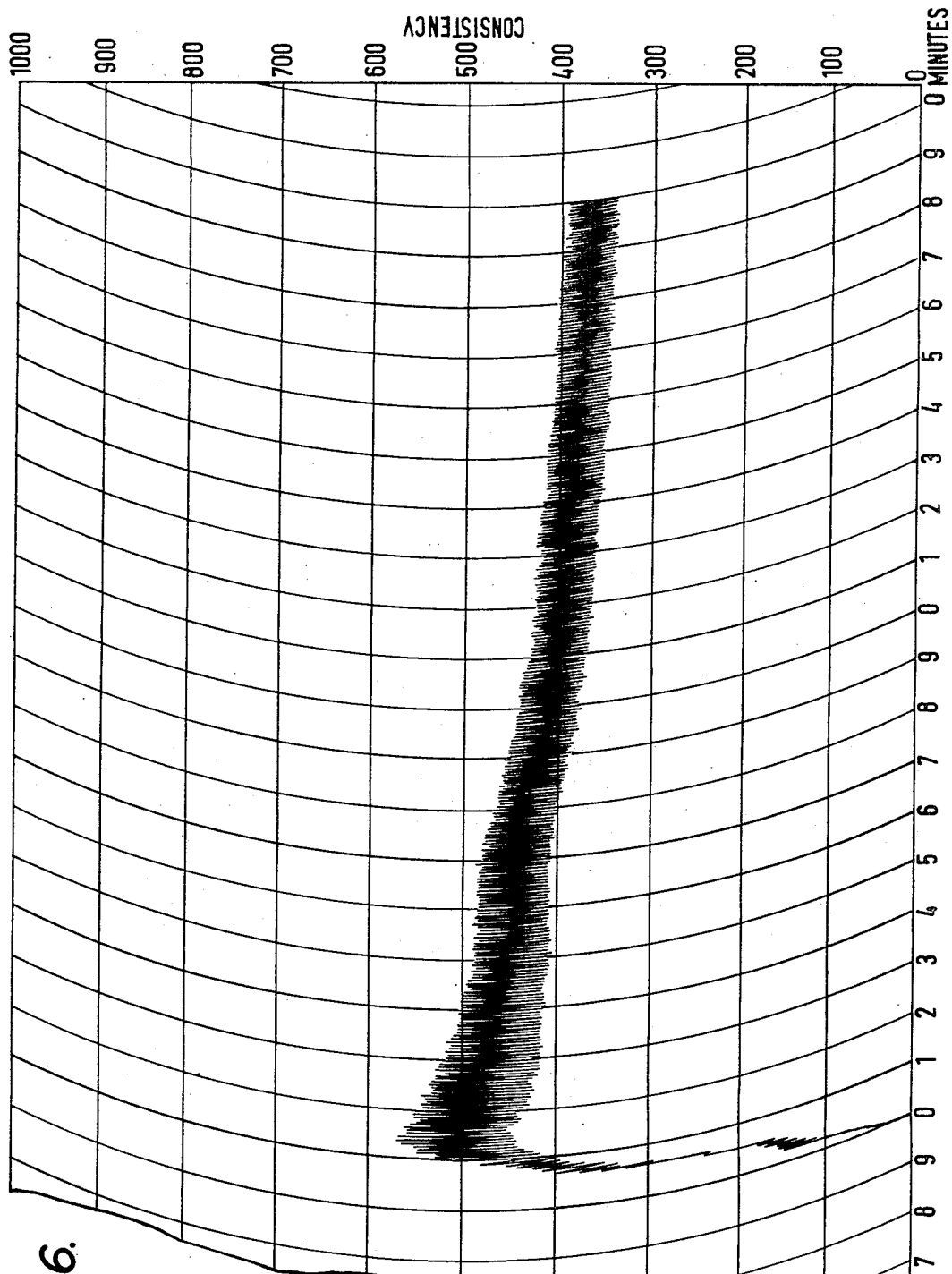
FIGS. 6 to 9 are graphs showing Brabender farinograph curves of the agglomerated gluten product and, for comparative purposes, various other materials.
Figure 7:
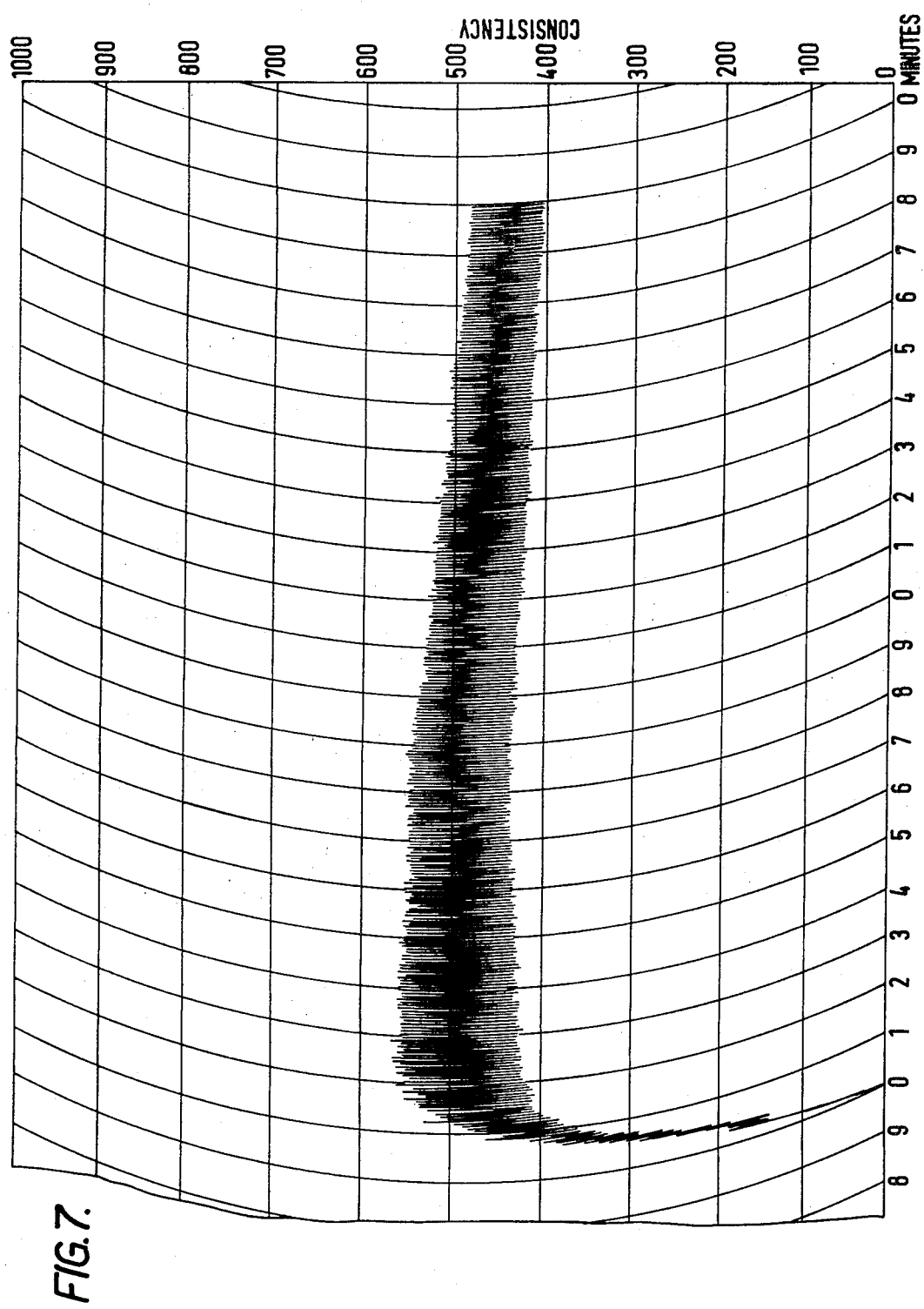
Figure 8:
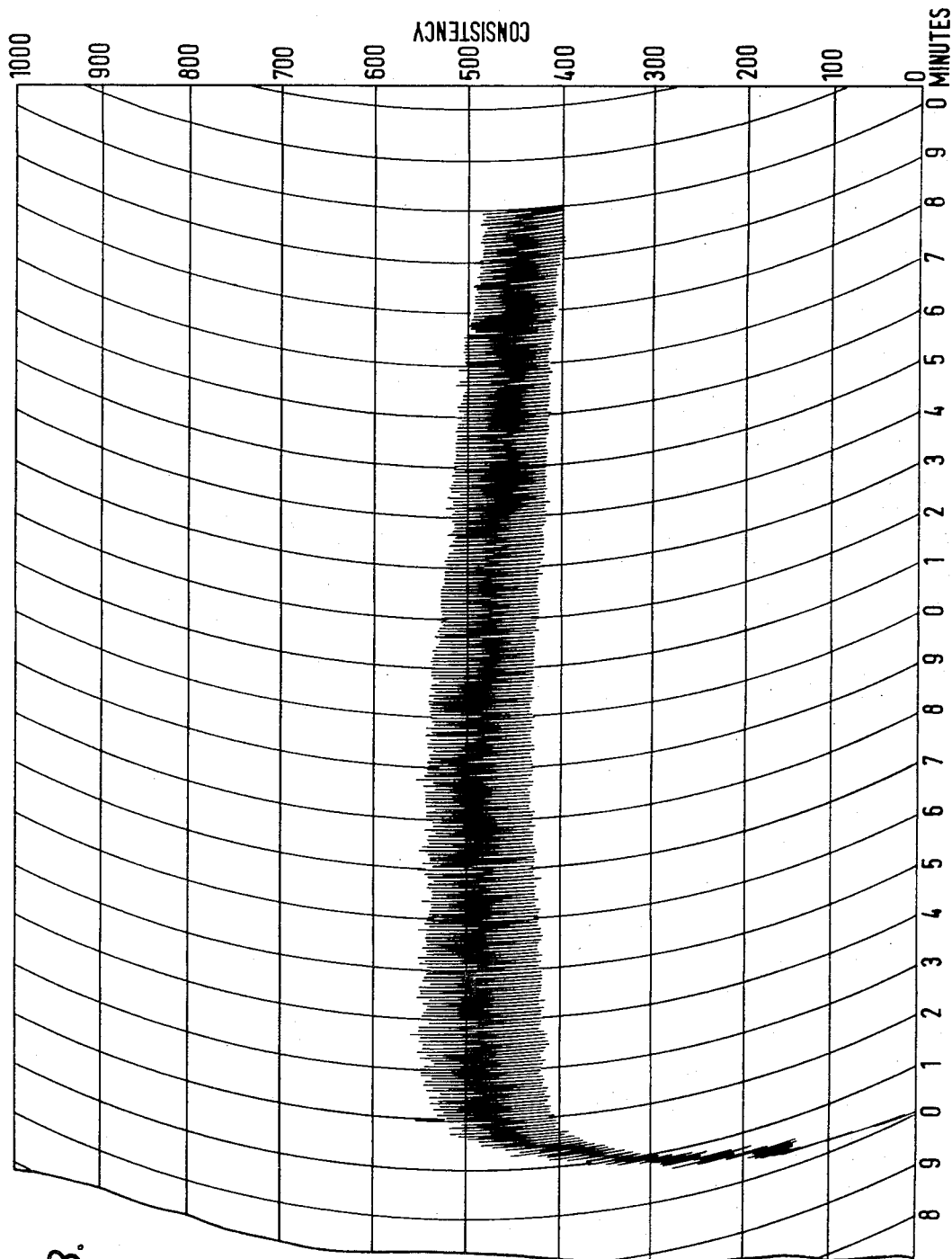
Figure 9:
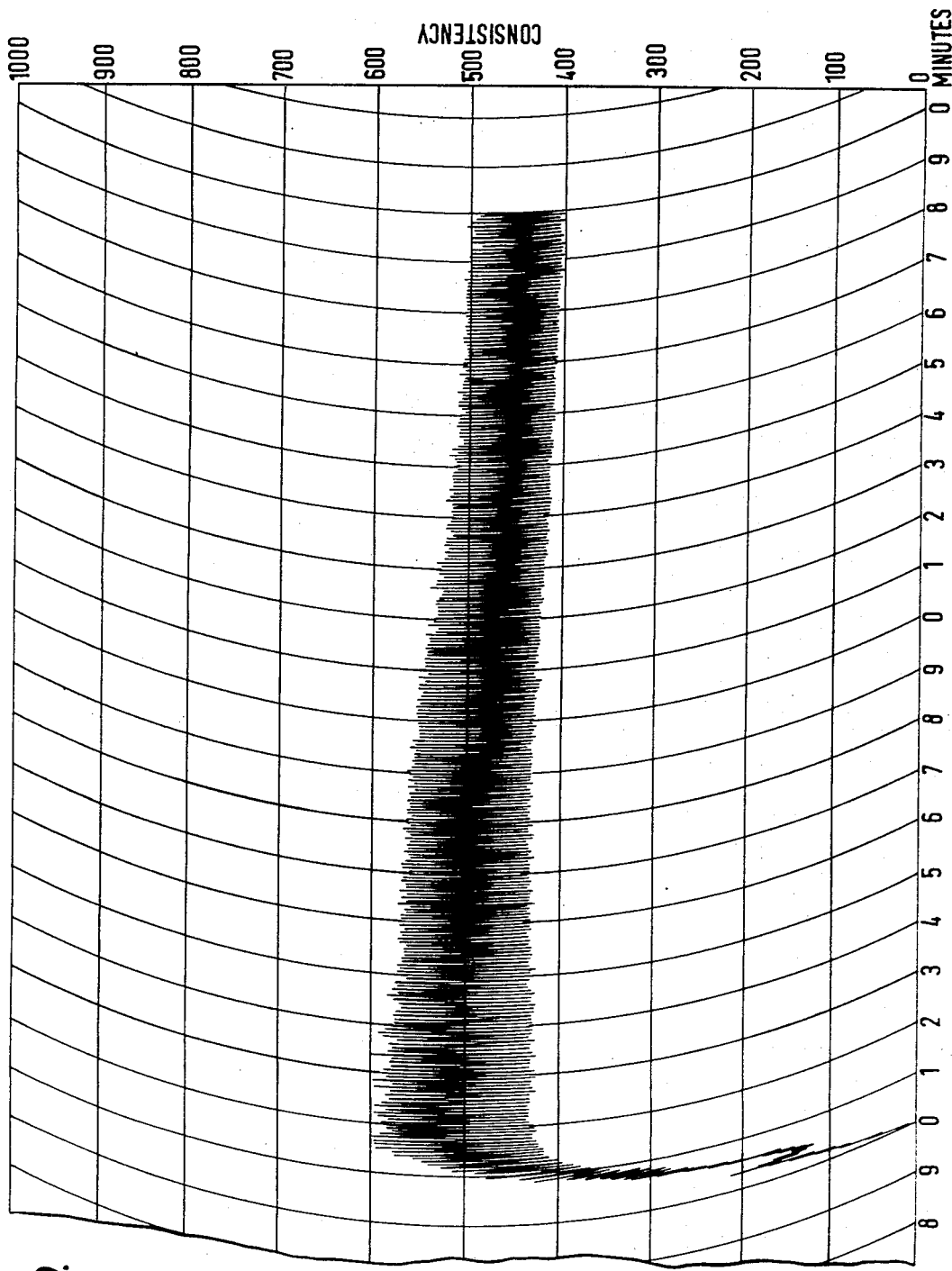

The contrast between the three sorts of gluten product (i to iii) in respect of wettability and dispersibility is illustrated in FIGS. 4 and 5. FIG. 4 shows the result, after a gven time in seconds as indicated on the stopclock, of placing a spoonful of the powdered gluten and a spoonful of the agglomerated gluten on the surface of water in two beakers (A and B respectively) with gentle stirring of the contents at the same speed. Corresponding FIG. 5 shows the comparable result for treated powdered gluten and the agglomerated gluten (A and B respectively). As can be seen, in both instances, almost all the agglomerated gluten has sunk beneath the surface and, in moving toward the bottom of the beakers, has disintegrated and dispersed to form a relatively uniform slurry. In contrast thereto, the bulk of both the untreated and treated powdered gluten have remained floating on the surface of the water.

(E) Dispersion stability.—The stability, i.e. the resistance of individual particles in an aqueous dispersion of the agglomerated gluten to coalesce was determined by placing 5 gms. of the material in 100 ml. distilled water at 20° C., while stirring continuously with a mechanical stirrer operating at 350 r.p.m. For comparison, dispersions were formed in an identical manner with the same amount of untreated powdered gluten and treated powdered gluten (coated with 20% by weight monoglyceride). Following formation, the dispersions were allowed to stand for 24 hours prior to evaluating the stability of the dispersion as reflected in the extent to which individual particles stayed separated and distinct. Both the agglomerated gluten and the treated powdered gluten exhibited little coalescence between individual particles and remained in the form of a fairly uniform dispersion. This contrasted with the ordinary powdered gluten in which the particles had flocked together to give a more or less unified and intractable mass of hydrated gluten.

(F) Porosity.—Reference has been made herein to the porous nature of the individual gluten agglomerates. A bulk mass of the agglomerates is likewise porous on account both of the porous nature of the agglomerates themselves, and bridging between the agglomerates which prevents a closely packed relationship and, gives rise to many interstitial spaces. The superior porosity of the agglomerated gluten compared to ordinary powdered gluten is demonstrated in the following test:

A glass tube 150 mm. long and 16 mm. internal diameter was packed with gluten to a depth of 100 mm.; the gluten was tapped down firmly. With the tube in the vertical position, 1 ml. of water was pipetted into the tube. The depth of penetration of the water, in mm., into the sample after 30 seconds was noted. With a typical sample of agglomerated gluten, the water penetrated 25 mm. in contrast to the 1 mm. penetration achieved in ordinary powdered gluten. This comparative test clearly demonstrates the superior porosity of the agglomerated gluten.

(H) Moisture content.—The residual moisture content in the agglomerated gluten product is important in ensuring optimum dispersion of the agglomerated gluten in water; we have found that an agglomerated gluten with a moisture content in excess of 10% is less readily dispersed in water than agglomerated gluten with a lower moisture content. Preferably, the residual moisture content is between 6 and 8%, for then the agglomerated gluten often disperses spontaneously simply on addition to water and usually there is no need for even gentle stirring. Ordinary powdered gluten typically has a residual moisture content of between 4 and 6%.

A still further characteristic of the agglomerated gluten is that its flavor and baking characteristics are not noticeably impaired by the agglomerating treatment, as will be demonstrated by the comparative tests in examples hereinafter.

Summarising the characteristic and advantageous properties of the agglomerated gluten as compared with ordinary gluten powder, the functionality of the former is markedly superior because it is readily wetted and dispersed in water to form a relatively stable dispersion, i.e. reduced tendency to coalesce. For these reasons, it is ideally suited for use in the manufacture of yeast-leavened bakery products, especially in continuous dough-making bread processes involving the initial formation of a liquid preferment or brew, where the agglomerated gluten may be added directly to the brew without any difficulties associated with the wetting and dispersing thereof, or the formation of a foam, and maintained in a dispersed state simply with gentle agitation until final dough development takes place.

The free-flowing character of the agglomerated gluten is reflected in the ease with which it can be removed from a package and poured without plugging or dusting.

The invention is further described in the following examples, which, being illustrative are not intended to limit the scope of the invention, except as such limitations may appear in the appended claims.

EXAMPLE 1

Preparation of agglomerated gluten

The apparatus assembly described with reference to FIG. 2 of the accompanying drawings was used in a typical run to process a powdered gluten commercially available from Industrial Grain Products Limited, Thunder Bay, Ontario, Canada. The gluten was fed into the reactor at a rate of 600 lbs. per hour and formed into a fluidized bed by admitting heated air to the chamber through the diffuser plate at a constant rate of 40 f.p.m. Water in the form of droplets of a size 10 to 100 microns was sprayed into the fluidized bed through ten, two-fluid nozzles, each delivering 1.5 i.g.p.h. water, utilizing air at a pressure of 35 p.s.i.g., as the atomizing agent. The temperature of the air entering the plenum chamber below the diffuser plate was about 115° C. and the temperature of the gluten in the treatment chamber was about 46° C.

The bulk of the gluten recovered from the above process was in the form of dry, coarse, irregularly-shaped agglomerates at least 90% of which remained on a 100 mesh screen, i.e. >149 microns.

That the agglomerated gluten so-obtained retains the original chemical properties of the original powdered gluten and differs therefrom only in certain advantageous physical properties is demonstrated by the results given in the following table which comparies relevant properties of the agglomerated gluten with those of the initial powdered gluten.

TABLE II.—COMPARISON OF PROPERTIES OF AGGLOMERATED GLUTEN AND POWDERED GLUTEN

| Property | Agglomerated | Powdered |
| --- | --- | --- |
| Moisture (percent) | 8 | 5. |
| Protein (percent) dry basis | 80 | 80. |
| Ash (percent) dry basis | 0.8 | 0.8. |
| Colour | Cream | Off-white. |
| Bulk density (g./cc.) [1] | 0.36 | 0.42. |
| Flowability (seconds) [1] | 15 | Does not flow. |
| Aqueous dispersion | Uniform | Lumpy; impossible to disperse. |
| Dispersion stability | Can be resuspended [2] | |
| Mesh analyses: [1] | | |
| on 25 | 2.2 | |
| on 40 | 30.2 | |
| on 60 | 37.4 | |
| on 80 | 19.2 | 1.1. |
| on 100 | 3.2 | 30.5. |
| on 120 | 2.8 | 37.9. |
| on 140 | 2.2 | 10.9. |
| on 170 | 1.0 | 8.2. |
| on 200 | 1.8 | 10.1. |
| thru 200 | | 1.3. |

[1] Tests conducted as described hereinbefore.
[2] With slight stirring after standing for 24 hours.

That the protein quality of the agglomerated gluten is unimpaired relative to the initial powdered gluten was shown by comparisons of Brabender farinographs of flour containing the same amount of agglomerated gluten of this example, and the powdered gluten as well as, for illustrative purposes, a treated (20% by weight monoglyceride) powdered gluten of the prior art.

In each instance, 8% by weight of the given gluten was admixed with 92% by weight of untreated soft wheat flour. For control purposes, a farinograph was run on the soft wheat flour alone.

The farinograph curves are reproduced as FIG. 6 to 9 of the accompanying drawings and the results are summarised in the table below:

TABLE II

| Product | Water absorption [1] (percent) | A[2] | B[3] | C[4] | D[5] | E[6] |
|---|---|---|---|---|---|---|
| Soft wheat flour | 52.5 | 1 | 1.5 | 3 | 4 | 35 |
| Agglomerated gluten | 57.1 | 1.3 | 2.5 | 15.2 | 17 | 25 |
| Untreated powder gluten | 56.8 | 1.5 | 3.5 | 16 | 17.5 | 5 |
| Treated gluten | 55.1 | 1.1 | 1.5 | 17.4 | 18 | 30 |

[1] The absorption or water-holding capacity of the flour-gluten mixture is expressed as a percentage of water in the dough at a consistency such that the farinograph curve centers on the 500 Brabender Unit (BU) line at a point of maximum development.
[2] Arrival time—Indicates the time in minutes required for dough to reach 500 BU consistency.
[3] Peak time—Indicates the time in minutes for the dough to reach its peak consistency.
[4] Stability—Indicates the time in minutes during which any part of the curve is at or above the 500 BU consistency level.
[5] Departure time—Indicates the time in minutes from the start of mixing until top of farinograph band recrosses the 500 BU line.
[6] Mixing tolerance index—Indicates the decrease in Barbender Units from the peak viscosity to a point 5 minutes after the peak.

It will be apparent upon comparison of the fairinograph curves that the protein quality of the agglomerated gluten is in no way inferior to that of the powdered gluten, treated or untreated. Moreover, it will be noted that the agglomerated gluten has the highest water absorption capacity, which is an important factor, especially in the baking industry, for such an increase permits the baker to increase his yield from a given weight of flour.

Further evidence as to the unimpaired protein quality of the agglomerated gluten is provided by Brabender extensographs of compositions containing a given amount of the agglomerated gluten of this example, ordinary powdered gluten and powdered gluten treated with 20% by weight of a monoglyceride. These tests were conducted under standard conditions on a Brabender extensograph which is a well-known device for measuring and recording the extensibility and resistance to extension of flour doughs. In this instance, the doughs were derived from the following compositions:

TABLE IV

| | Composition | | |
|---|---|---|---|
| Dough | Gluten (gms.) | Wheat starch [1] (gms.) | Water (cc.) |
| Agglomerated gluten | 42.9 | 232.5 | 210.6 |
| Untreated powdered gluten | 43.8 | 232.8 | 209.4 |
| Treated powdered gluten | 52.4 | 221.8 | 211.8 |

[1] The wheat starch used was Supergell, commercially available from Industrial Grain Products Limited, Thunder Bay, Ontario, Canada.

The results of the extensograph analyses are summarised in the table below:

TABLE V

| | Resistance to extension (BU) | | Extensibility (time units) | |
|---|---|---|---|---|
| Dough | 1 hour | 2 hours | 1 hour | 2 hours |
| Agglomerated gluten | 723 | 1,009 | 4.52 | 3.65 |
| Untreated powdered gluten | 750 | 960 | 4.27 | 3.75 |
| Treated powdered gluten | 526 | 807 | 4.58 | 4.2 |

It will be apparent upon comparison of the foregoing results that the quality of the agglomerated gluten has not been deleteriously affected in the process of making it from the gluten powder starting material.

EXAMPLE 2

Four samples of agglomerated gluten were prepared following the basic procedure of Example 1 but employing, in the four runs, different operating conditions as summarised in the table below:

TABLE VI

| | Run Number | | | |
|---|---|---|---|---|
| Condition | 1 | 2 | 3 | 4 |
| Airflow rate (s.c.f.m./ft.[2]) | 60 | 60 | 40 | 40 |
| Temperature of inlet air (° C.) | 137 | 137 | 137 | 115 |
| Temperature of gluten (° C.) (fluidized bed) | 51 | 57 | 60 | 46 |
| Gluten feed rate (lb. per hour) | 100 | 75 | 1,350 | 1,300 |
| Gluten particle size | −18+80 | −18+80 | −16+100 | −16+100 |
| Water feed rate (gal. per hour) | 4 | 4 | 13 | 20 |
| Atomizing pressure (p.s.i.g.) | 50 | 50 | 35 | 35 |

Various properties of the four samples of agglomerated gluten are summarised in the table below:

TABLE VII

| | Run Number | | | |
|---|---|---|---|---|
| Property | 1 | 2 | 3 | 4 |
| Moisture (percent) | 4.5 | 5.0 | 5.0 | 8.0 |
| Protein (percent) (dry basis) | 80.5 | 80.7 | 80.7 | 80 |
| Ash (percent) (dry basis) | 0.8 | 0.8 | 0.8 | 0.8 |
| Colour | Cream | Cream | Cream | Cream |
| Bulk density (gm./cc.) | .40 | .40 | .40 | .36 |
| Flowability (seconds) | 13 | 14 | 13 | 15 |
| Dispersibility | Good: needs gentle stirring. | Good: needs gentle stirring. | Good: needs gentle stirring. | Good: spontaneous. |
| Dispersion stability | Can be resuspended with slight stirring after settling for 24 hours | | | |
| Vitality | Good | Fair | Fair | Good |
| Mesh analyses: | | | | |
| on 25 | | | Not tested | 2.2 |
| on 40 | 5.9 | | Not tested | 30.2 |
| on 60 | 32.0 | | Not tested | 37.4 |
| on 80 | 42.2 | | Not tested | 19.2 |
| on 100 | 6.2 | | Not tested | 3.2 |
| on 120 | 4.5 | | Not tested | 2.8 |
| on 140 | 3.2 | | Not tested | 2.2 |
| on 170 | 1.8 | | Not tested | 1.0 |
| on 200 | 4.2 | | Not tested | 1.8 |
| thru 200 | | | | |

EXAMPLE 3

The superior functionality of the agglomerated gluten in its application to the baking industry in comparison with untreated powdered gluten and treated powdered gluten was demonstrated in a sponge dough bread-making process. The agglomerated gluten used was that from Example 1. One of the treated powdered glutens comprised powdered gluten coated with 20% monoglyceryl stearate. For control purposes, the process was repeated with no added gluten.

FORMULATION

| Ingredients | Content (gms.) | |
|---|---|---|
| | Sponge | Dough |
| Flour [1] | 240 | 160 |
| Sugar | | 12 |
| Salt | | 8 |
| Water | 144 | 98 |
| Yeast | 8 | |
| Yeast food [2] | 1 | |
| Milk powder | | 12 |
| Shortening | | 12 |
| Gluten [3] (4% of flour) | 4 or 8 | |

[1] The flour used was a 50-50 blend of hard and soft wheat flours (moisture content of 13.5%, .46% ash, 10.2% protein).
[2] The yeast food was of the Arkady Dougle Strength type.
[3] The agglomerated gluten product, and the untreated and treated powdered glutens were added to the sponge at levels of 4% by weight in each case, based on the weight of the flour.

Formulation

The sponge was made by mixing the sponge ingredients in the McDuffy bowl of a Hobart mixer for 5 minutes at low speed. This sponge was set to ferment for 4 hours at 27° C. The dough was then made by adding the dough ingredients to the sponge, mixing 12 minutes at high speed. This dough was then rested for 15 minutes and scaled at 162 g. for pup loaf baking at 230° C. for 25 minutes. It was noted that the agglomerated gluten was the most easily dispersed in the water.

Results

One hour after baking, the volume of each loaf was measured by rapeseed displacement. The loaves were judged the following day. Both external and internal characteristics were observed and rated according to the standard scoring procedure of the American Institute of Baking. The total score (maximum of 100 for a perfect loaf) is the sum of the scores of the internal and external characteristics. Specific volume was calculated by dividing bread volume in cubic centimeters by dough weight in grams. The results are reported in the table below.

TABLE VIII

| Gluten type | Level, percent | Specific volume (cc./gm.) | Total bread score |
|---|---|---|---|
| Agglomerated gluten (Example No. 1) | 4 | 6.4 | 90 |
| Untreated powdered gluten | 4 | 6.4 | 90 |
| Treated powdered gluten | 4 | 6.2 | 89 |
| Control (No gluten) | 0 | 5.6 | 83 |

Conclusions

It is apparent from the results quoted that the agglomerated gluten gave the best baking result, and that, in comparison with powdered gluten and the treated gluten, the agglomerated gluten had not lost any vitality in the process for preparing it.

EXAMPLE 4

A similar evaluation to that of Example 3 was conducted using a continuous bread process involving "Amflow" continuous dough making equipment manufactured by the Bakery Division, American Machine and Foundry Corporation. The machine used was a pilot plant Amflow model which was a smaller scale version, specially adapted for experimental investigation, of the larger commercial machine, and consumed 100 lbs. flour per hour to produce 180 lbs. dough per hour. The same three glutens were employed as in the preceding example, and the formulation is shown in the table below.

TABLE IX.—CONTINUOUS DOUGH FORMULATION

| Ingredient | Content (lb.) | |
|---|---|---|
| | Brew | Dough |
| Flour | 40 | 100 |
| Water | 57 | 67 |
| Yeast | 3 | 3 |
| Ammonium sulfate | 0.08 | 0.08 |
| Sugar | 0.5 | 7 |
| Salt | 0.2 | 0.2 |
| Dry gluten | 3 | 3 |
| Milk | | 1 |
| Calcium acid phosphate | | 0.4 |
| Calcium propionate | | 0.1 |
| Atmul | | 0.1 |
| Shortening | | 3.3 |
| Potassium bromate | | [1] 60 |
| Potassium iodate | | [1] 10 |

[1] Parts per million.

Procedure

The brew which contained 40% of the total flour was made by mixing the various brew ingredients and then setting the mixture at 80° F. The incorporation of the untreated powdered gluten was achieved by preblending with the flour. The brew was allowed to ferment at this temperature for 2½ hours without agitation. During this period, hydration and relaxation (necessary for developing gluten functionality) occurred. The remainder of the flour, water, yeast, ammonium sulfate, sugar, salt and gluten and the other ingredients were combined in the usual manner at the incorporator. Processing conditions were identical to those usually employed. The developed doughs were extruded directly from the high-speed developer into tared pans, proofed for 70 minutes and baked for 18 minutes at 218° C.

Results (a) It was noted that the agglomerated gluten was more readily wetted and became more fully hydrated and relaxed than the monoglyceride coated gluten.

(b) It was noted that the dry gluten added to the brew had an effect on the behaviour of this brew. Both the powdered vital wheat gluten and the agglomerated vital wheat gluten lowered the foaming properties of the fermenting brew. This was a distinct advantage since excessive foaming leads to overflow of the brew from the preparation and storage tanks, a recognised problem in continuous bakery operations. The control brew which did not contain added gluten had a marked tendency to foam. And, not surprisingly, this tendency to foam was even more marked with the brew which contained the monoglyceride coated gluten. The amount of foaming was measured by determining the volume increase of the brew. With no gluten, the brew volume increased 70% and the brew collapsed and started to foam again. With gluten present (both the powdered and agglomerated), brew volume increased only 30%; with the monoglyceride coated gluten, the brew volume increased 100%.

(c) All the bread obtained was of good quality, but that obtained using the agglomerated gluten was noticeably the best having the highest volume, strongest sidewalls, a fine, uniform grain and a soft, velvety texture.

As Examples 3 and 4 show, the agglomerated gluten product of this invention is well suited for application in the baking industry offering distinct and significant advantages over the ordinary powdered gluten and coated gluten products presently used.

It is of especial value for use in continuous dough-making processes for it can be readily and conveniently incorporated in the liquid fermentation brew so that the gluten has time to hydrate and relax which is needed for the development of its functionality in the dough system. Although in the foregoing description reference has been made to the use of the agglomerated gluten in the manufacture of bread, it will be understood that the product may be used in the manufacture of other products, such, for example, as pasta materials.

Since it is not feasible to exemplify all possible variations of this invention, it will be understood that the invention is not limited to the specific embodiments illustrated herein.

What is claimed is:

1. A process for improving the functionality of vital wheat gluten without denaturing the protein, which comprises:
   (i) forming the powdered gluten into a fluidized bed;
   (ii) maintaining the bed in a particulate fluidized state by passing a fluidizing gas, such as compressed air, upwardly through the bed;
   (iii) discharging a wetting agent in atomized form directly into the particulate, fluidized bed between the top and the bottom thereof so as to agglutinate the surfaces of the particles which are commingled, by the gentle agitation of particles in the bed, to an extent sufficient to cause such particles on contact with adjacent particles to adhere together in the form of moist, irregularly-shaped agglomerates; and
   (iv) drying the agglomerates by means of the fluidizing gas to a residual moisture content of less than about 10%.

2. A process as claimed in claim 1, wherein the wetting agent is water.

References Cited

UNITED STATES PATENTS

| | | | |
|---|---|---|---|
| 3,391,003 | 7/1968 | Armstrong et al. | 99—93 X |
| 3,362,829 | 1/1968 | Landfried et al. | 99—93 X |

RAYMOND N. JONES, Primary Examiner

J. R. HOFFMAN, Assistant Examiner

U.S. Cl. X.R.

99—90 HP, 91, 93, DIG. 4